US 6,902,291 B2

(12) United States Patent
Rizkin et al.

(10) Patent No.: US 6,902,291 B2
(45) Date of Patent: Jun. 7, 2005

(54) IN-PAVEMENT DIRECTIONAL LED LUMINAIRE

(75) Inventors: Alexander Rizkin, Redondo Beach, CA (US); Robert H Tudhope, Rancho Palos Verdes, CA (US)

(73) Assignee: Farlight LLC, Wilmington, CA (US)

( * ) Notice: Subject to any disclaimer, the term of this patent is extended or adjusted under 35 U.S.C. 154(b) by 0 days.

(21) Appl. No.: 10/620,524

(22) Filed: Jul. 16, 2003

(65) Prior Publication Data

US 2004/0114355 A1 Jun. 17, 2004

Related U.S. Application Data

(63) Continuation-in-part of application No. 10/277,230, filed on Oct. 21, 2002, and a continuation-in-part of application No. 09/867,881, filed on May 30, 2001, now abandoned.

(51) Int. Cl.[7] .............................. E01F 9/00; F21V 29/00; F21V 13/04
(52) U.S. Cl. .................. 362/153.1; 362/240; 362/245; 362/246; 362/294; 362/373; 362/555
(58) Field of Search ................................ 362/145, 147, 362/153.1, 218, 234, 244–246, 249, 251, 252, 294, 345, 364, 365, 373, 555, 576, 580, 800

(56) References Cited

U.S. PATENT DOCUMENTS

| | | | | |
|---|---|---|---|---|
| 4,382,274 A | * | 5/1983 | De Backer et al. ......... 362/153 |
| 6,155,703 A | * | 12/2000 | Rizkin et al. ............... 362/576 |
| 6,168,294 B1 | * | 1/2001 | Erni et al. ................... 362/576 |
| 6,210,017 B1 | * | 4/2001 | Miura et al. .............. 362/153.1 |
| 6,565,239 B2 | * | 5/2003 | Rizkin et al. ............... 362/373 |
| 6,568,827 B2 | * | 5/2003 | Forster ..................... 362/153.1 |

* cited by examiner

Primary Examiner—Alan Cariaso
(74) Attorney, Agent, or Firm—Gehrke & Associates, S.C.; Lisa A. Brzycki

(57) ABSTRACT

An in-pavement high intensity LED-based luminaire includes a housing, a power controller, a light module and a thermoelectric cooling device. The housing includes a generally flat top surface having at least one transparent window for output light passage. The power controller has an input and an output, wherein the input is electrically connected to an airfield power infrastructure and the output is electrically connected to a light module. The light module includes multiple high flux LEDs and a non-imaging light transformer. The non-imaging light transformer includes an input end opposite an output end, a refractive member located around the LED optical axis, and a total internal reflection member. The thermoelectric cooling device provides LED temperature control for emitted luminous flux, color and spatial intensity distribution stabilization, and is electrically connected to the power controller.

18 Claims, 5 Drawing Sheets

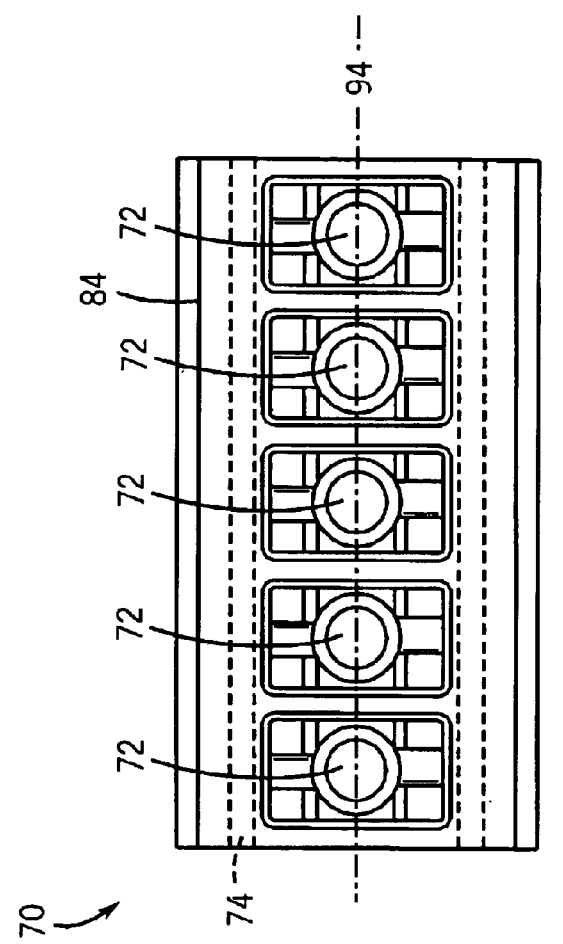
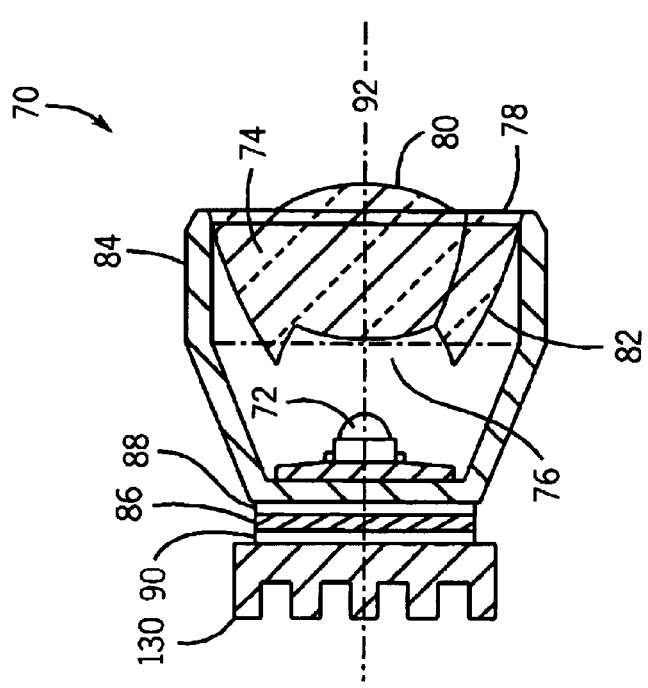
FIG. 2B
FIG. 2A

IN-PAVEMENT DIRECTIONAL LED LUMINAIRE

CROSS-REFERENCE TO RELATED APPLICATIONS

This application is a continuation-in-part application of U.S. Ser. No. 09/867,881 filed May 30, 2001 abandoned and U.S. Ser. No. 10/277,230 filed Oct. 21, 2002.

BACKGROUND OF THE INVENTION

1. Field of the Invention

The present invention relates generally to luminaires for airfield lighting. In particular, the present invention relates to in-pavement directional luminaires for runways and taxiways including centerline, touchdown zone, threshold/end, edge, stop bar and the like.

2. Discussion of the Related Art

Although many specific improvements have been implemented in in-pavement luminaire designs, these basic improvements remain unchanged in that they generally consist of using an incandescent bulb as a light source combined with conventional optics as a beam forming element.

A number of disadvantages related to this design include high maintenance costs, specifically relating to relamping due to low bulb life-time (500 to 1,000 hours) and the inability of conventional optics to efficiently provide complicated spatial luminous intensity distribution, which results in very low efficiency (percents) and high power consumption.

A new generation of lighting devices is based on sold state technology. In addition to other benefits, light emitting diodes (LEDs) have high efficiency in that they produce more light per watt and they have an extremely long life. Recent advances have taken place in the area of directional LED lamp construction.

One of the basic categories of LED lamp construction is the implementation of multiple LEDs in a cluster to combine luminous flex from multiple LEDs using primary optics integrated in the LED for directionality. LED manufacturers offer a wide choice of primary optics including from 120° to 5° directionality.

This configuration is typically implemented for relative low intensity devices, but for high intensity LEDs, this conventional design is not practical because of space limitations and the small size of the window in in-pavement luminaires. Additionally, it is well-known that clusters of LEDs typically have various thermal problems, thereby negatively impacting on the photometric parameters such as luminous flux and color change.

The other basic category of construction of LED luminaire design is based on the use of secondary optics—an external to the LED optical element for the concentration and the direction of light.

In contrast to conventional optics, non-imaging optical elements are very efficient, specifically for LEDs with wide angular divergence. While one design consideration may be to combine the cluster design with the non-imaging optic for an application that requires high intensity light, this combination unfortunately requires an individual optical element for each LED.

What is needed, therefore, to overcome these limitations found in conventional designs is the application of multiple high flux LEDs with termostabilization using a single non-imaging element as a secondary optic.

SUMMARY OF THE INVENTION

The present invention includes in-pavement high intensity LED-based luminaire including a housing, a power controller, a light module, and a thermoelectric cooling device. The housing includes a generally flat top surface having at least one transparent window for output light passage. The power controller has an input and an output, wherein the input is electrically connected to an airfield power infrastructure and the output is electrically connected to a light module. The light module includes multiple high flux LEDs and a non-imaging light transformer. Each of the LEDs is connected to the power controller and emits light with a wide divergence. The LEDs are located in linear alignment in a plane perpendicular to an LED optical axis. The non-imaging light transformer includes an input end opposite an output end, a refractive member located around the LED optical axis, and a total internal reflection member. The light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end. The thermoelectric cooling device provides LED temperature control for emitted luminous flux, color and spatial intensity distribution stabilization, and is electrically connected to the power controller.

According to another aspect of the invention, an in-pavement high intensity LED-based luminaire includes a housing, a power controller, a light module, a holder and a thermoelectric cooling device. The housing includes a generally flat top surface having at least one transparent window for output light passage. The power controller includes an input and an output, wherein the input is electrically connected to an airfield power infrastructure and the output is electrically connected to a light module. The light module includes multiple LEDs and an non-imaging light transformer. Each of the multiple high flux LEDs is connected to the power controller and emits light with a wide divergence. The LEDs are located in linear alignment in a plane perpendicular to an LED optical axis. The non-imaging light transformer includes an input end opposite an output end, a refractive member located around the LED optical axis, and a total internal reflection member integrated in a single transparent element having a mutual focal point. The light transformer is shaped as a rectangular bar in a horizontal cross-section and has a precalculated profile in a vertical cross-section. The light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end. The holder supports the LEDs and mounts the light transformer. The thermoelectric cooling device provides LED temperature control for emitted luminous flux, color and spatial intensity distribution stabilization. The thermoelectric device is electrically connected to the power controller, has direct thermal contact on a cool side of the cooling device with the holder, and has direct thermal contact on a hot side of the cooling device with the housing that is configured as a radiator for the cooling device.

According to yet another aspect of the invention, a light module includes multiple high flux LEDs, a non-imaging light transformer, a holder and a thermoelectric cooling device. The multiple high flux LEDs are located in linear alignment with high density in a plane perpendicular to a LED optical axis, and each LED is connected to a power controller and emits light with a wide divergence. The non-imaging light transformer includes an input end opposite an output end, a refractive member located around the LED optical axis, and a total internal reflection member integrated in a single transparent element having a mutual focal point. The light transformer is shaped as a rectangular bar in a horizontal cross-section and has a precalculated profile in a vertical cross-section. The light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end. The holder supports the LEDs and mounts the light transformer. The holder is fabricated from material with a low thermal resistance and is configured as a heat sink for the LEDs. The thermoelectric cooling device provides LED temperature control for emitted luminous flux, color and spatial intensity distribution stabilization. The thermoelectric device is electrically connected to the power controller, has direct thermal contact on a cool side of the cooling device with the holder, and has direct thermal contact on a hot side of the cooling device with a radiator.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear understanding of the various advantages and features of the present invention, as well as the construction and operation of conventional components and mechanisms associated with the present invention, will become more readily apparent by referring to the exemplary, and therefore non-limiting, embodiments illustrated in the following drawings which accompany and form a part of this patent specification.

FIG. 2 illustrates a cross-sectional side view (A) and a front view (B) of a light module constructed in accordance with the present invention;

DETAILED DESCRIPTION OF THE PREFERRED EMBODIMENTS

Figure 1:
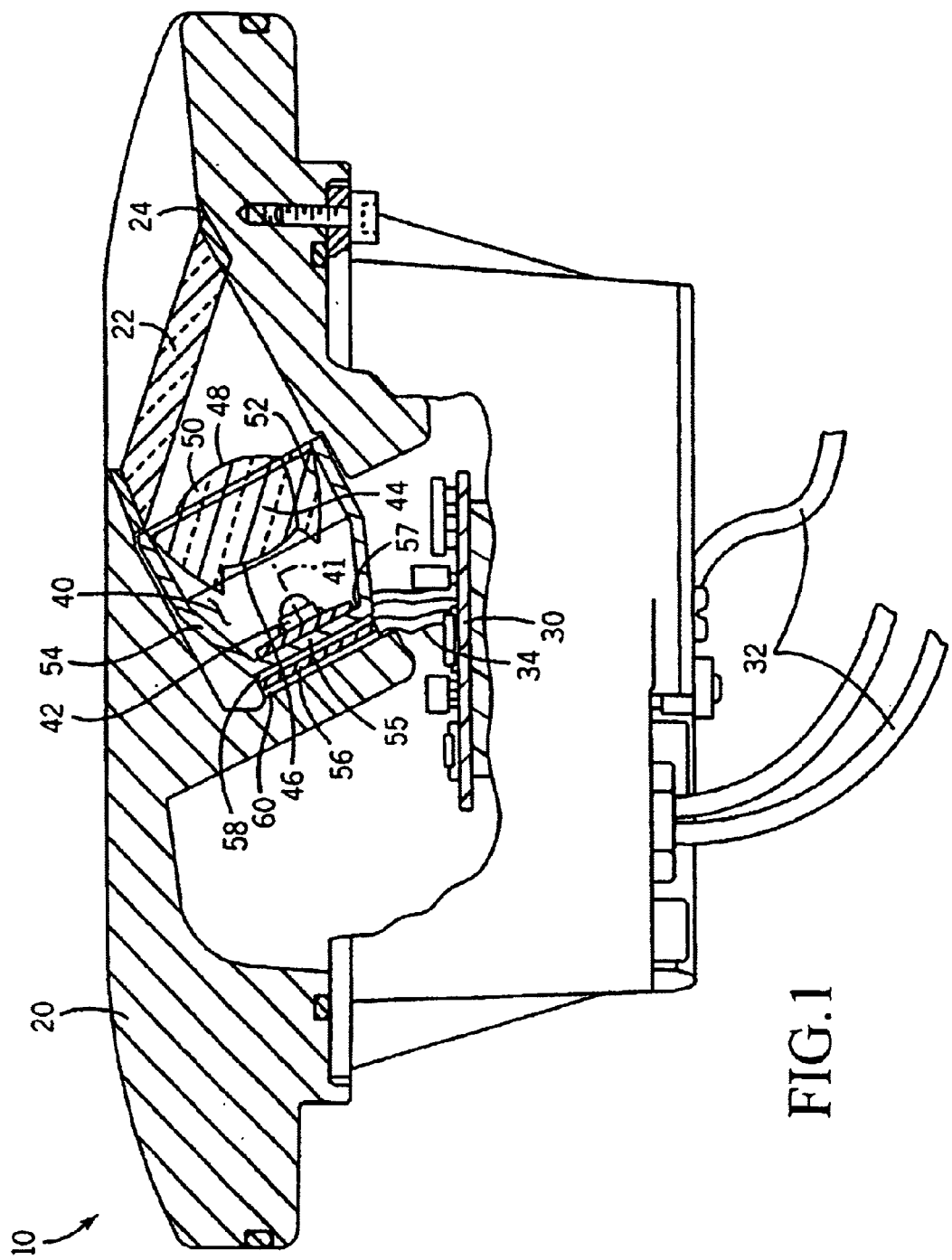
FIG. 1 illustrates a cross-sectional view of an in-pavement luminaire constructed in accordance with the present invention.

Referring now to FIG. 1, an in-pavement high intensity luminaire 10 includes a housing 20 having at least one transparent window 22 for output light passage and sealing member 24 forming a watertight seal between window 22 and housing 20.

A power controller input 32 is electronically connected to airport power infrastructure, and a power controller output 34 is electrically connected to a light module 40. Power controller input 32 and output 34 are designed to interface and operate with existing airport lighting infrastructure including intensity variation by constant current regulator compliance standard regulations.

Light module 40 includes a plurality of high flux LEDs 42, which are connected to power controller output 34 and located linearly with high density in a plane perpendicular to an optical axis 41 of LEDs 42. A non-imaging light transformer 44 includes an input end 46 facing LEDs 42, and an output end 48, located on an opposite end of transformer 44 from input end 46, a refractive member 50 disposed around LED optical axis 41, and a total internal reflection member 52 located around refractive member 50.

Light transformer 44 is shaped in the vertical cross-section according to refractive member 50 and total internal reflection member 52 calculated profiles, symmetrical in the vertical plane to LED optical axis 41. In the horizontal plane (perpendicular to FIG. 1 plane), light transformer 44 is shaped as a rectangular bar, disposed along LED axis 41 so that light transformer input end 46 is located at light transformer 44's focal distance from LEDs 42.

Light module 40 also includes a holder 54, which holds light transformer 44 and serves as a support structure and heat sink for mounting LED's 42. Holder 54 is fabricated from material with low thermal resistance. A thermoelectric cooling device 56 is electrically connected to power controller output 34 and installed on a holder side 55 opposite a side 57 provided for mounting LEDs 42 to provide direct thermal contact between a cool side 58 of cooling device 56 and holder 54. A hot side 60 of cooling device 56 is installed in direct thermal contact with housing 20, which serves as a heat sink for thermoelectrical cooling device 56.

Referring now to FIG. 2, a light module 70 has a plurality of high flux LEDs 72 for emitting light with a wide divergence, non-imaging light transformer 74 that compresses the emitted light into a desired pattern. Light module 70 further includes a holder 84 for LEDs 72 and light transformer 74 installation, and a thermoelectrical cooling device 86 that provides LED temperature control. LEDs 72 are electrically connected to an outside power source (not shown). Multiple LEDs 72 are dispersed with high intensity along an axis 94 perpendicular to LEDs optical axes 92.

Non-imaging light transformer 74 includes an input end 76 facing LEDs 72, an output end 78 located on an opposite end of transformer 74 from input end 76, a refractive member 80 disposed around LED optical axis 92, and a total reflection member 82, located around refractive member 80.

Light transformer 74 is shaped in a vertical cross-section (see FIG. 2A) according to refractive member 80 and total reflection member 82 calculated profiles, and is symmetrical with respect to LED optical axis 92. LEDs 72 are located at the focal distance from light transformer input end 76. In the horizontal plane (FIG. 2B), light transformer 74 is shaped as a rectangular bar, disposed along and symmetrical with respect to axis 94.

Holder 84 functions to (1) mount light transformer 74, (2) mount LEDs 72, (3) serves as a LED heat sink, and (4) secures the focal distance between LEDs 72 and light transformer input end 76. In the preferred embodiment of the present invention, holder 84 is fabricated from material with low thermal resistance. Thermoelectrical cooling device 86 is electrically connected to an output power source (not shown).

Figure 4:
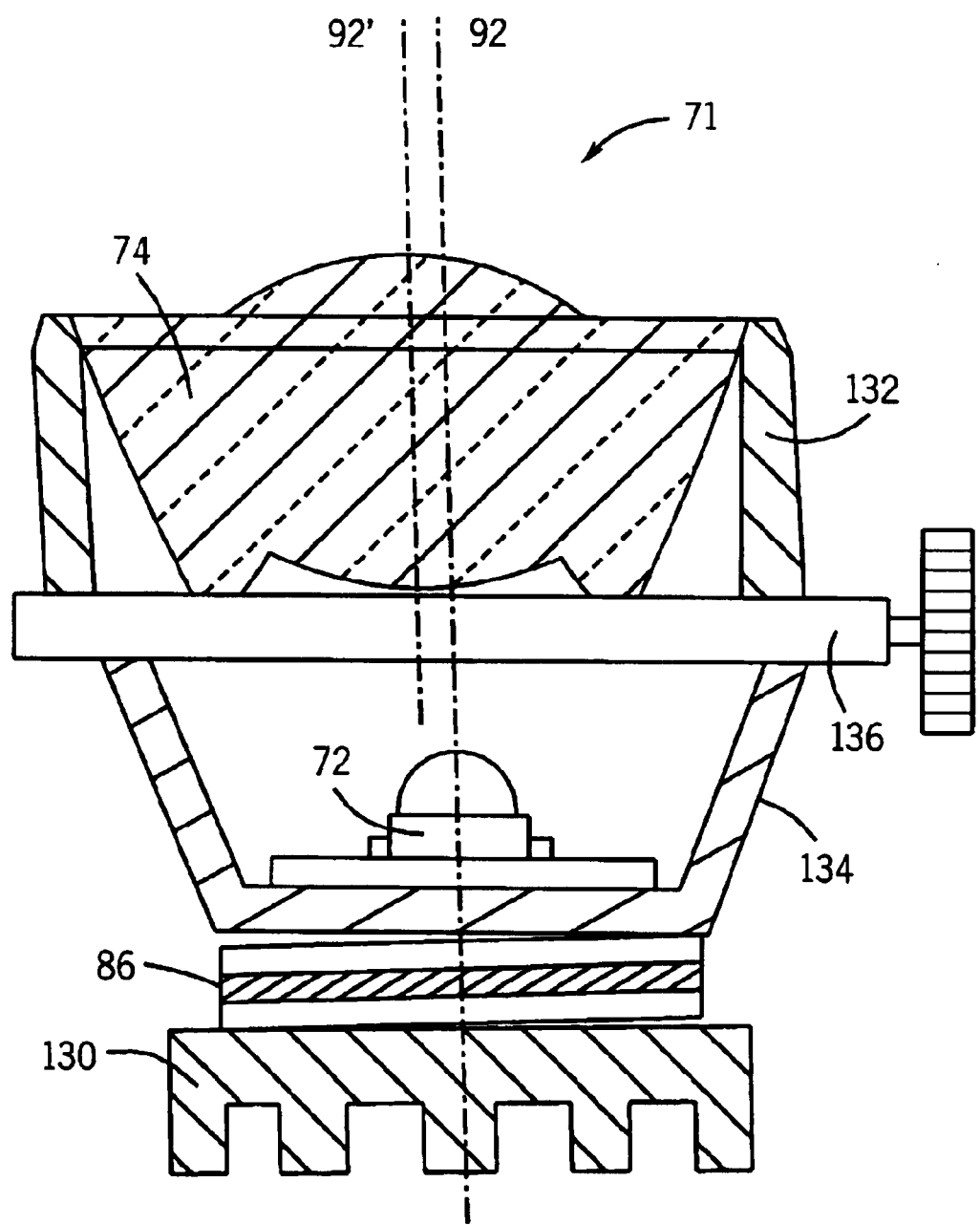
FIG. 4 illustrates a cross-sectional view of a light module having a kinematic mechanism for LED and light transformer linear displacement according to the present invention.

In order to provide LED temperature control, a cool side 88 of thermoelectrical cooling device 86 includes direct thermal contact with holder 84 on an opposite side from the LED installation. A hot side 90 of cooling device 86 has direct thermal contact with an outside radiator 130 (FIG. 4).

Figure 3A:
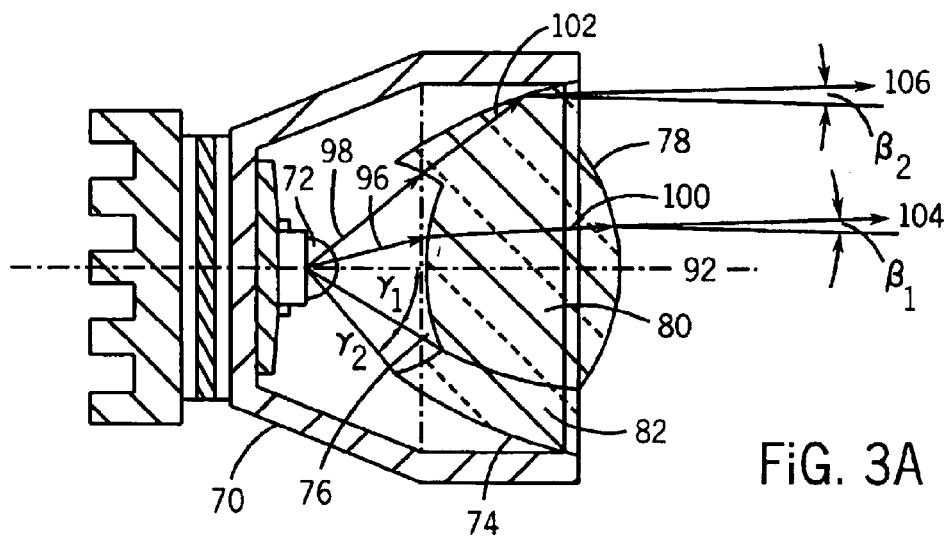
FIG. 3 illustrates a cross-sectional side view (A) and a cross-sectional top view (B) of a light module constructed in accordance with the present invention.

Referring to FIG. 3A, LED 72 emits light with wide divergence, but in a limited angle $2(\gamma_1+\gamma_2)$ preferably up to 160°. In operation, non-imaging light transformer 74 collects light via two mechanisms.

Light rays with low and medium divergence (not to exceed angle $\gamma_1$) are collected by refractive member 80 that is operated in the vertical plane in a first approximation similar to an aspheric lens.

Light rays with high divergence (angles $\gamma_2$) are collected by total internal reflection member 82. The profile of total internal reflection member 82 in the vertical plane is calculated in such a manner that provides total internal reflection for all rays in angle $\gamma_2$, and reflected rays are directed through output end 78 with a predetermined divergence given by the specification.

For example, an incident ray 96, emitted by LED 72 with a divergence not to exceed $\gamma_1$, passes through refractive member 80 as a ray 100. As a result of refraction on refractive member 80 with calculated profiles of input end 76 and output end 78, ray 100 is directed output as a ray 104, with divergence β, not exceeding a specified angle $\beta_{max}$ in the vertical plane with respect to axis 92.

An incident ray 98 emitted by LED 72 with divergence exceeding $\gamma_1$, but not exceeding $\gamma_2$, passes through total internal member 82 as a ray 102 and is reflected from an outside profile as a ray 106. The profile of total internal reflection member 82 is calculated to provide a divergence $\beta_2$ not exceeding a specified angle $\beta_{max}$ in the vertical plane.

Different methods and software are implemented in light transformer profile calculations. For example, in the preferred embodiment of the present invention, recurrent calculation based on a point-to-point profiling is calculated as follows:

1. Receiving maximum and minimum output angles;
2. Receiving a location of a portion of the light transformer profile with respect to a light source that provides light; and
3. Iteratively point-by-point calculating a light transformer profile by providing an associated increment for an output angle for each increment of an input angle, wherein the associated increment for the output angle is consistent with a predetermined output intensity distribution to transform the light provided by the light source according to the received maximum and minimum output angles based on the received location of a portion of the light transformer profile.

Figure 3B:
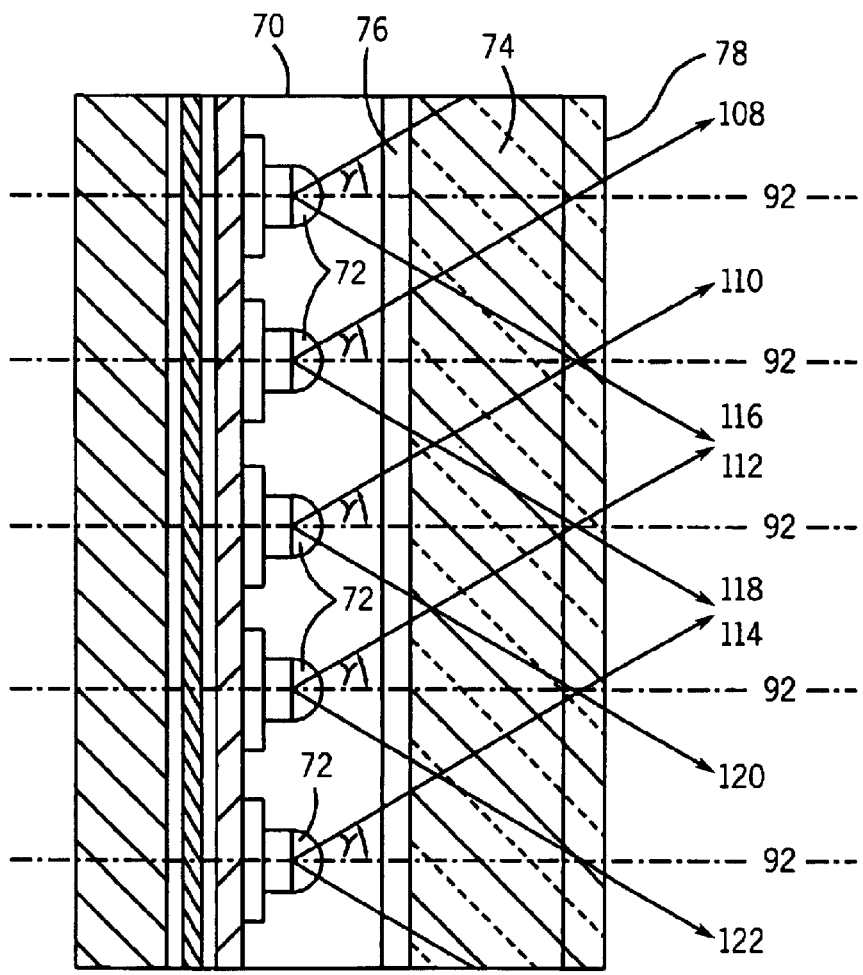

Referring now to FIG. 3B, LEDs 72 with an axial-symmetric primary optic emit light with a pattern in the horizontal plane identical to the pattern in the vertical plane. Light transformer 74 is shaped in the horizontal plane as a rectangular bar and as an optical window, and does not change the direction of passing rays intensity in the horizontal plane.

All rays emitted by LEDs 72 in a given direction, for example rays 108, 110, 112 and 114 emitted in angle γ with respect to LEDs optical axes 92, pass through light transformer 74 and are directed from output end 78 in the same angle γ. As a result, relative spatial intensity distribution in the horizontal plane will be identical to the single LED pattern, assuming a similar pattern for all multiple LEDs 72, but luminous intensity in every direction will increase proportionally to number of LEDs.

Referring now to FIG. 4, a light module 71 includes LEDs 72 with a LED holder 134, light transformer 74 with light transformer holder 132, and thermoelectrical cooling device 86. Outside radiator 130 serves as a thermoelectrical cooling device 86 heat sink (which is not necessarily a component of light module 71).

LED's holder 134 and light transformer holder 132 are joined together by a kinematic mechanism 136, thereby allowing linear displacement of LEDs optical axis 92 with respect to a light transformer optical axis 92' in the vertical plane.

Figure 5B:
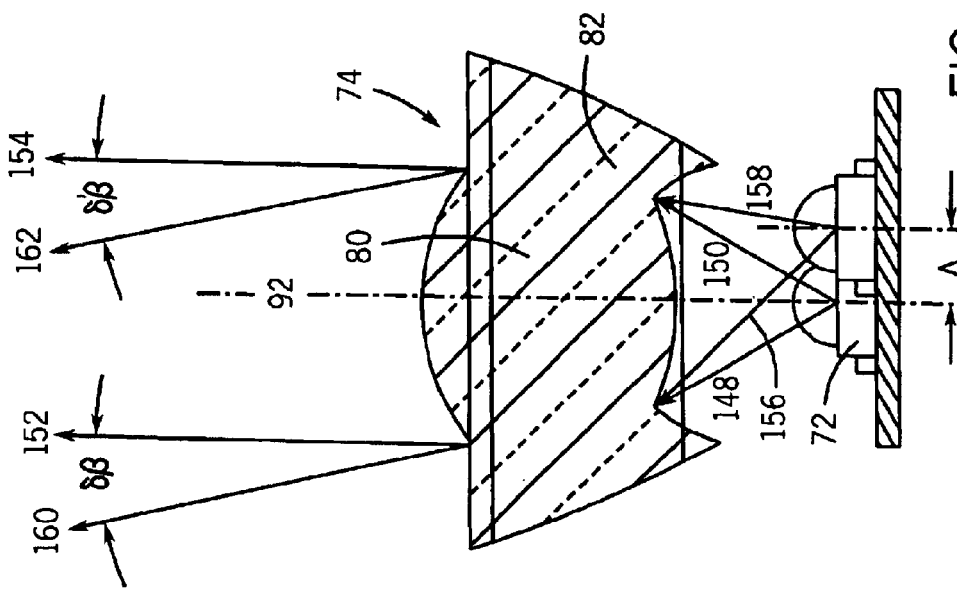
FIG. 5 illustrates a light transformer's performance with LED displacement marked A for a non-imaging member and B for a refractive member according to the present invention.
Figure 5A:
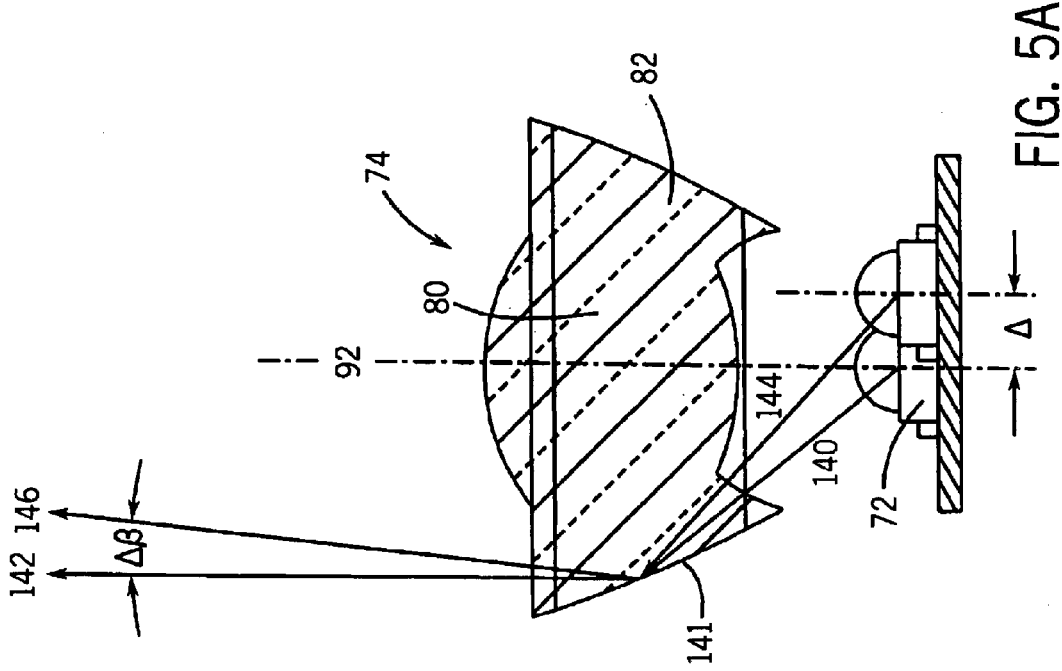

FIG. 5 illustrates light transformer interaction with LEDs 72 when an optical axis is displaced relative to the light transformer's optical axis. Referring to FIG. 5A, LED 72 emits a ray 140 which reflects in point A from an outer wall 141 of total internal reflection member 82 of light transformer 74 in direction 142 (assume for simplicity that ray 142 is parallel to LED/optical transformer coincidental optical axis 92). With linear mutual displacement Δ in the vertical plane, point A becomes a point of reflection for ray 144, and reflected ray 146 will be directed in angle Δβ with respect to ray 142, and consequently optical axis 92.

FIG. 5B illustrates refractive member 80 of light transformer 74 with linear displacement Δ between LEDs 72 and light transformer optical axis 92. Light emitted by LED 72 in the angle between a ray 148 and a ray 150 collected by light transformer 74 refractive member 80 is directed as a beam between a ray 152 and a ray 154 (assume for simplicity that rays 152 and 154 are parallel to optical axis 92).

With linear displacement Δ between LEDs 72 and light transformer optical axis 92, refractive member 80 collects light emitted by LED 72 in an angle between a ray 156 and a ray 158, having an incident angle different from rays 148 and 150.

As a result, ray 156 is refracted in direction 160 with angular displacement $\delta_\beta$ with respect to optical axis 92, and ray 158 is refracted in direction 162 with angular displacement $\delta'_\beta$ with respect to optical axis 92.

As a result of LED 72 optical axis displacement, both non-imaging member 82 and refractive member 80 of light transformer 74 have an outgoing angular pattern and intensity distribution that are different from the case when the optical axis of LEDs 72 and the optical axis of light transformer 74 are coincidental.

Based on a given LED 72 intensity distribution and a calculated light transformer 74 profile, the new outgoing light pattern and intensity distribution is calculated as a superposition of both non-imaging member 82 and refractive member 80 light pattern for each given value of displacement.

The scope of the application is not to be limited by the description of the preferred embodiments described above, but is to be limited solely by the scope of the claims that follow. For example, LEDs can be replaced by an array of laser diodes or the LEDs can be substituted by plasma light sources with primary optics (e.g., a fusion light) without departing from the scope of the preferred embodiment of the present invention.

What is claimed is:

1. An in-pavement high intensity LED-based luminaire comprising:
   a housing including a generally flat top surface having at least one transparent window for output light passage;
   a power controller having an input and an output, wherein the input is electrically connected to an airfield power infrastructure and the output is electrically connected to a light module;
   the light module including,
      a plurality of high flux LEDs, wherein each of the LEDs is connected to the power controller and emits light with a wide divergence, said LEDs located linearly in a plane perpendicular to an LED optical axis;
      a non-imaging light transformer that includes an input end opposite an output end, a refractive member located around the LED optical axis, and a total internal reflection member, wherein the light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end; and
   a thermoelectric cooling device providing LED temperature control for emitted luminous flux, color and spatial intensity distribution stabilization, wherein the thermoelectric device is electrically connected to the power controller.

2. A luminaire according to claim 1, wherein the window includes a sealing member forming a watertight seal between the window and the housing.

3. A luminaire according to claim 1, wherein the power controller is designed to interface and operate with existing airport lighting infrastructure including intensity variation by constant current regulator compliance standard regulation.

4. A luminaire according to claim 1, further comprising a holder for supporting the LEDs and mounting the light transformer.

5. A luminaire according to claim 4, wherein the holder is fabricated from material with low thermal resistance and is configured as a heat sink for the LEDs.

6. A luminaire according to claim 5, wherein the thermoelectric cooling device has direct thermal contact on a cool side of the cooling device with the holder, and has direct thermal contact on a hot side of the cooling device with the housing that is configured as a radiator for the cooling device.

7. A luminaire according to claim 1, wherein the refractive member and the total internal reflection member are integrated in a single transparent element having a mutual focal point.

8. A luminaire according to claim 1, wherein the light transformer is shaped as a rectangular bar in a horizontal cross-section and has a precalculated profile in a vertical cross-section.

9. An in-pavement high intensity LED-based luminaire comprising:
   a housing including a generally flat top surface having at least one transparent window for output light passage;
   a power controller having an input and an output, wherein the input is electrically connected to an airfield power infrastructure and the output is electrically connected to a light module;
   the light module including,
      a plurality of high flux LEDs, wherein each of the LEDs is connected to the power controller and emits light with a wide divergence, said LEDs located linearly in a plane perpendicular to an LED optical axis;
      a non-imaging light transformer that includes an input end opposite an output end, a refractive member located around the LED optical axis, and a total internal reflection member integrated in a single transparent element having a mutual focal point, wherein the light transformer is shaped as a rectangular bar in a horizontal cross-section and has a precalculated profile in a vertical cross-section, and wherein the light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end;
   a holder for supporting the LEDs and mounting the light transformer; and
   a thermoelectric cooling device providing LED temperature control for emitted luminous flux, color and spatial intensity distribution stabilization, wherein the thermoelectric device is electrically connected to the power controller, has direct thermal contact on a cool side of the cooling device with the holder, and has direct thermal contact on a hot side of the cooling device with the housing that is configured as a radiator for the cooling device.

10. A luminaire according to claim 9, wherein the window includes a sealing member forming a watertight seal between the window and the housing.

11. A luminaire according to claim 9, wherein the power controller is designed to interface and operate with existing airport lighting infrastructure including intensity variation by constant current regulator compliance standard regulation.

12. A luminaire according to claim 9, wherein the holder is fabricated from material with low thermal resistance and is configured as a heat sink for the LEDs.

13. A luminaire according to claim 9, wherein the light module further includes a thermosensor, wherein the thermosensor is electrically connected to the power controller, said power controller including an electronic circuit which allows automatically switching "on-off" power to the thermoelectrical cooling device to provide cooling only when an optical module temperature rises above a preselected threshold.

14. A light module, comprising:
   a plurality of high flux LEDs located in linear alignment with high density in a plane perpendicular to a LED optical axis, wherein each LED is connected to a power controller and emits light with a wide divergence;
   a non-imaging light transformer that includes an input end opposite an output end, a refractive member located around the LED optical axis, and a total internal reflection member integrated in a single transparent element having a mutual focal point, wherein the light transformer is shaped as a rectangular bar in a horizontal cross-section and has a precalculated profile in a vertical cross-section, and wherein the light transformer collects a significant amount of light through the input end that is emitted by the LEDs that are located at a distance equal to the light transformer's focal distance from the input end, compresses and redistributes the collected light in a vertical plane with high efficiency into a predetermined pattern, and directs the compressed light outside of the light module through the output end;

a holder for supporting the LEDs and mounting the light transformer, wherein the holder is fabricated from material with a low thermal resistance and is configured as a heat sink for the LEDs; and a thermoelectric cooling device providing LED temperature control for emitted luminous flux, color and spatial intensity distribution stabilization, wherein the thermoelectric device is electrically connected to the power controller, has direct thermal contact on a cool side of the cooling device with the holder, and has direct thermal contact on a hot side of the cooling device with a radiator.

15. A light module according to claim 14, wherein the holder includes a LED support and a light transformer mounting, wherein the support and the mounting are joined together by a kinematic mechanism that allows mutual linear displacement of the support and the mounting in the vertical plane.

16. A light module according to claim 14, further comprising a housing having an opening for passing light therethrough, said housing having direct thermal contact with the holder and configured as the outside radiator.

17. A light module according to claim 16, wherein a light shaping element is dispersed along the opening.

18. A light module according to claim 17, wherein the light shaping element is a holographic diffuser.

* * * * *